United States Patent

Anders et al.

[11] B 4,000,855
[45] Jan. 4, 1977

[54] BELLCRANK ASSEMBLY, NOZZLE ACTUATOR

[75] Inventors: Larry E. Anders, Palm Springs; Joel F. Sutton, Lake Park, both of Fla.

[73] Assignee: The United States of America as represented by the Secretary of the Air Force, Washington, D.C.

[22] Filed: Apr. 14, 1975

[21] Appl. No.: 567,892

[44] Published under the second Trial Voluntary Protest Program on March 16, 1976 as document No. B 567,892.

[52] U.S. Cl. .......................................... 239/265.39
[51] Int. Cl.² ........................................ B64C 15/08
[58] Field of Search ................ 239/265.11, 265.19, 239/265.25, 265.27, 265.29, 265.33, 265.35, 265.37, 265.39; 60/228, 230, 232; 244/12 A, 12 D, 23 D

[56] References Cited
UNITED STATES PATENTS

| | | | |
|---|---|---|---|
| 3,724,759 | 4/1973 | Ellis | 239/265.39 X |
| 3,730,436 | 5/1973 | Madden et al. | 239/265.39 |

FOREIGN PATENTS OR APPLICATIONS

| | | | |
|---|---|---|---|
| 745,178 | 2/1956 | United Kingdom | 239/265.37 |

*Primary Examiner*—John J. Love
*Assistant Examiner*—Andres Kashnikow
*Attorney, Agent, or Firm*—Joseph E. Rusz; Arsen Tashjian

[57] ABSTRACT

A bellcrank assembly, adapted for mounting on, and actuating, a convergent flap of the exhaust nozzle of a turbojet engine. The unique structure of the assembly, unlike the prior art, transmits radial and bi-directional thrust loads to the flap utilizing low cost stamped and formed sheetmetal components, with the loads being transmitted directly into the skin of the flap. The bellcrank assembly is structured for external mounting on the convergent flap, thereby permitting easy inspection, maintenance and service, without the need to disassemble other nozzle hardware; and, it includes angular contact bearings with cross-corner path arrangement, and bellcrank link arms and a bellcrank actuator arm which actually physically comprise the housing of the bellcrank.

4 Claims, 4 Drawing Figures

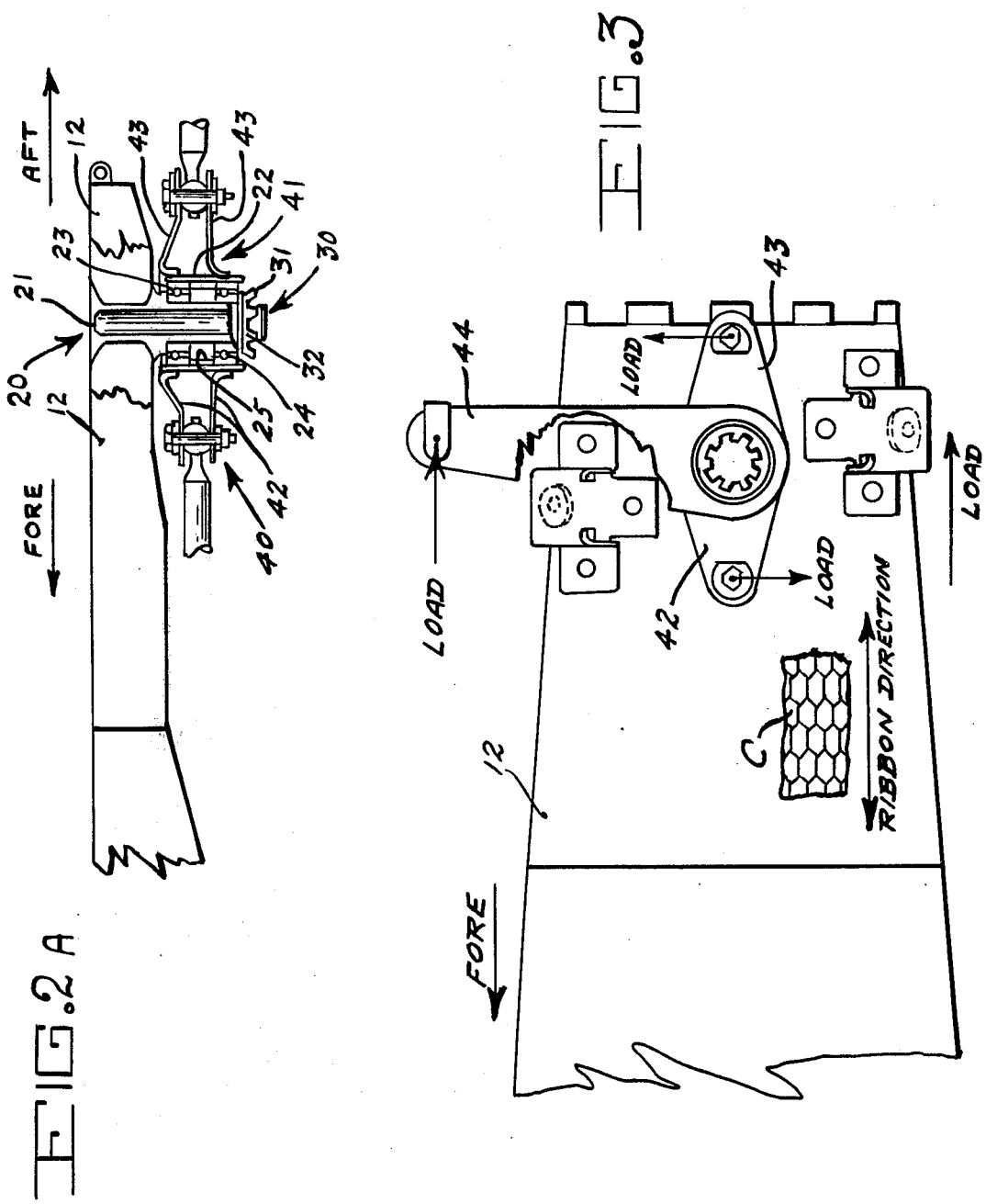

BELLCRANK ASSEMBLY, NOZZLE ACTUATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to actuating systems for exhaust nozzles of turbojet engines, and more particularly to a lightweight bellcrank assembly for the nozzle actuation system.

Actuation systems featuring synchronization are well known in the prior art, and the mechanical implementation of such a system is shown in U.S. Pat. No. 3,730,436. However, what is needed in the art and is not available is a bellcrank assembly that is capable of transmitting both radial and bi-directional thrust loads in a manner as set forth and described herein.

By fulfilling this need, we have advanced the state-of-the-art.

SUMMARY OF THE INVENTION

An object of this invention is to teach the structure of a bellcrank assembly that is capable of transmitting both radial and bi-directional thrust loads to a honeycomb flap structure, without improperly loading said structure.

Another object of this invention is to provide a shaft attachment means for said bellcrank assembly with a flange arrangement that insures proper load distribution in the honeycomb structure of the flap member.

Still another object of this invention is to provide a lightweight bellcrank housing structure that is capable of withstanding radial and thrust loading that occurs in operation.

Yet another object of this invention is to provide a unique bellcrank assembly which attains the above-mentioned objects and, nevertheless, utilizes low cost stamped and formed sheetmetal components (i.e., the components are sized to finished dimensions by using sheetmetal and sheetmetal forming techniques).

These objects, and other equally important and related objects, of our invention will become readily apparent after a consideration of the description of our invention, coupled with reference to the Figures of the drawings.

DESCRIPTION OF THE PREFERRED EMBODIMENT

Figure 1:
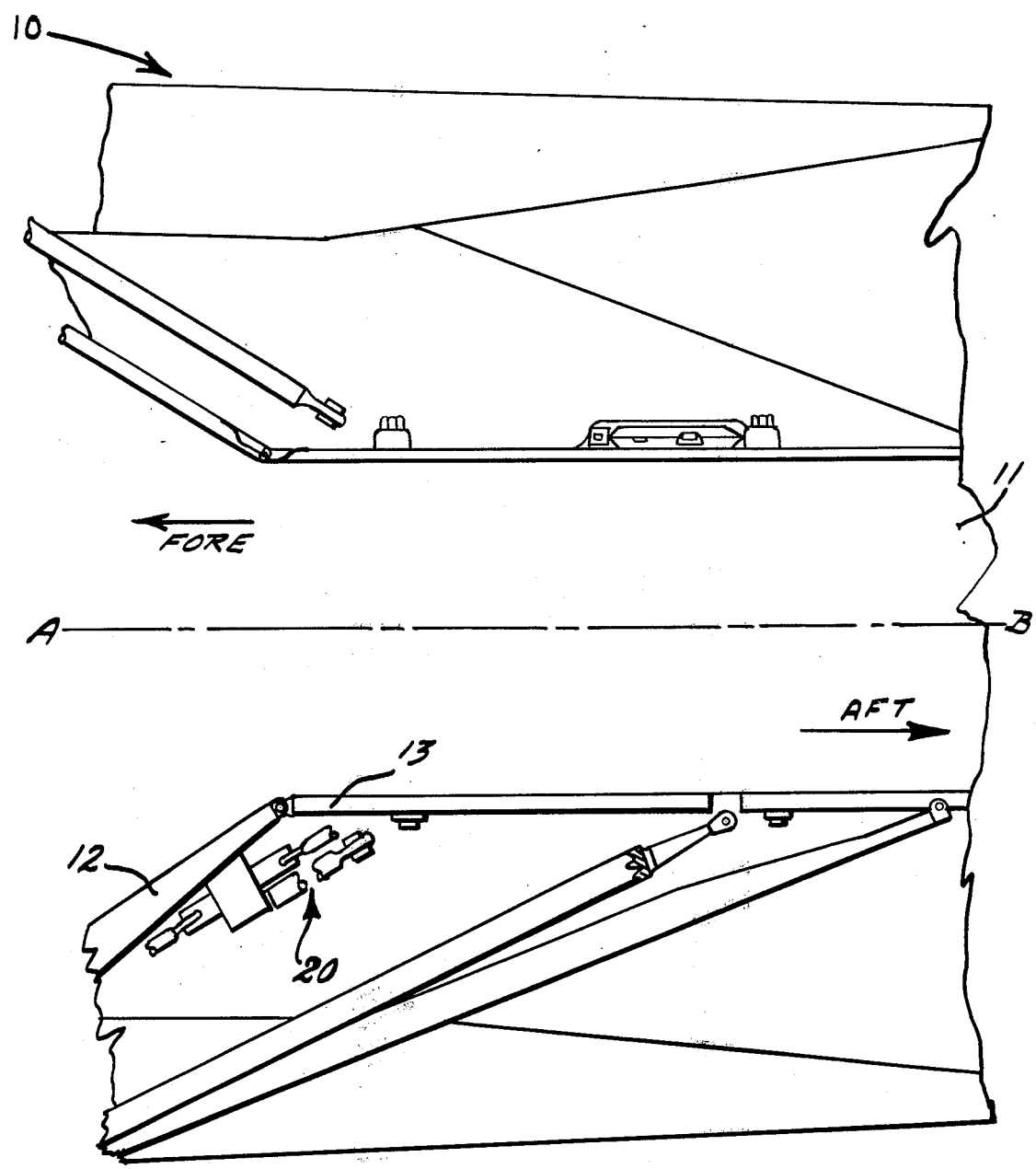
FIG. 1 is a longitudinal cross section, in simplified form, both schematic and pictorial of the aft end (i.e., the nozzle end) of a turbine engine, showing a preferred embodiment of our inventive bellcrank assembly in position.

With reference to FIG. 1, a preferred embodiment of our inventive bellcrank assembly, generally designated by reference numeral 20, is shown in its working environment located on convergent flap 12 of the exhaust nozzle 11 at the aft end of turbojet engine 10.

Also shown in FIG. 1 are: divergent flap 13; geometric longitudinal axis A-B of turbojet engine 10 (and, of course, of exhaust nozzle 11); and, the "fore" and "aft" directional designations.

Figure 2B:
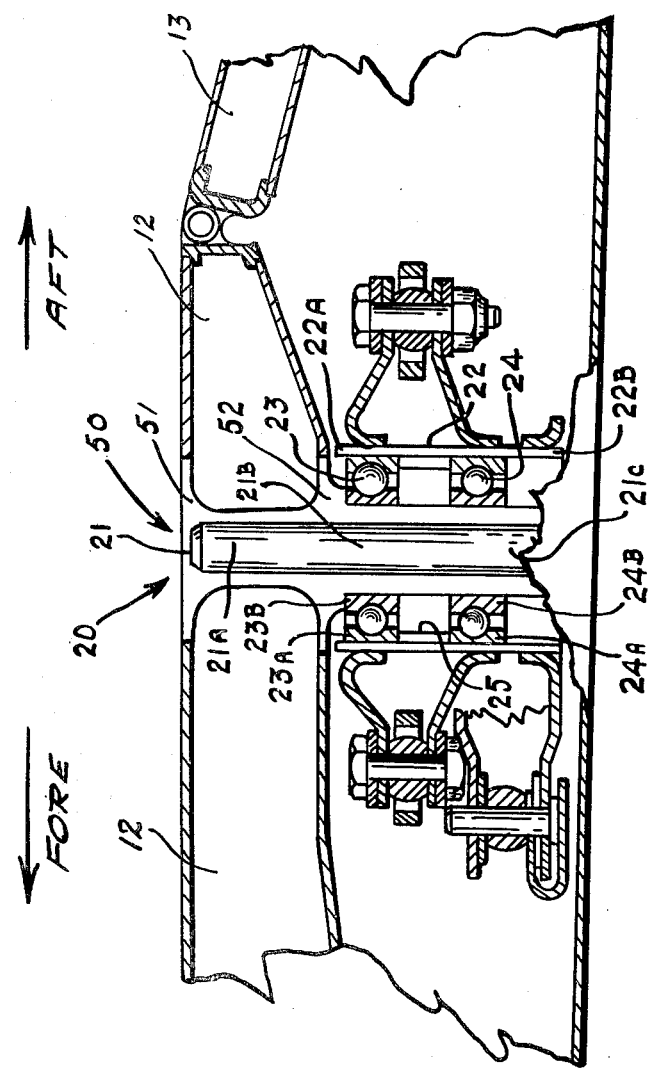
FIG. 2A, as well as FIG. 2B, is a cross sectional view, in simplified form, taken through the convergent flap, shown in FIG. 1, showing the preferred embodiment of our inventive bellcrank assembly, also shown in FIG. 1, in detail and enlarged; and, FIG. 3 is a bottom view of the convergent flap, shown in FIGS. 1, 2A and 2B, showing some major components of the preferred embodiment of our inventive bellcrank assembly and the loads acting thereon.

With reference to FIGS. 2A and 2B, therein is shown in detail the preferred embodiment 20 of our inventive bellcrank assembly, as mounted on convergent flap 12, together with directional designations.

Concisely, the preferred embodiment 20 of our inventive bellcrank assembly, comprises, in cooperative association: a shaft 21 (hereinafter referred to as the "bellcrank shaft"); a sleeve 22 external of, and around, the bellcrank shaft 21; a first bearing member 23; a second bearing member 24; a spacer 25 interposed between the bearings 23 and 24; means, generally designated 30, for securing the sleeve 22, the first 23 and the second 24 bearing members, and the spaceer 25 to the bellcrank shaft 21; a bellcrank housing subassembly, generally designated 40, that, in turn, includes a housing 41 to contain the sleeve 22, the first and second bearing members 23 and 24, and the spacer 25, and that also includes a fore bellcrank link arm 42, an aft bellcrank link arm 43, and a bellcrank actuator arm 44; means, such as 30, for securing the bellcrank housing subassembly 40 to the bellcrank shaft 21; and, means, generally designated 50 for mounting and for securing the bellcrank shaft 21 to the convergent flap 12.

More specifically, the bellcrank shaft 21 has a first end 21A, a middle portion 21B, and a second end 21C. The sleeve 22 also has a first end 22A and a second end 22B, and it 22 is so positioned that the first end 22A is generally located near the middle portion 21B of the bellcrank shaft 21, and it 22 is also so positioned that the second end 22B is generally located near the second end 21C of the bellcrank shaft 21. The first bearing member 23 is of the angular type; is interposed between the first end 22A of the sleeve 22 and the middle portion 21B of the bellcrank shaft 21; and has, and is moveably positioned in, races 23A and 23B. The spacer 25 is disposed between the first bearing member 23 and the second bearing member 24 and their respective races 23A and 23B and 24A and 24B; abuts the outer races 23A and 24A, but not the inner races 23B and 24B; and, it 25 simultaneously is interposed between the sleeve 22 and the bellcrank shaft 21. Means 30 for securing the sleeve 22, the bearing means 23 and 24 and their respective races 23A, 23B, 24A and 24B, and the spacer 25 to the bellcrank 21 may, but need not, comprise a lockwasher 31 and a bearing retaining nut 32, as shown in FIG. 2A.

The bellcrank housing subassembly 40 includes, as previously mentioned, a housing 41 which is made up of metal pieces that, in addition to forming and defining the housing 41 (to contain the sleeve 22, the bearing 23 and 24 and the races 23A, 23B, 24A and 24B, and the spacer 25), are also shaped to form (and due, in fact, form) bellcrank link arms 42 and 43 and bellcrank actuator arm 44 (not shown in FIGS. 1, 2A and 2B). The pieces (i.e., of the housing 41 and arms 42, 43 and 44) are fixedly secured, preferably by welding, to sleeve 22 (which is, in effect, a bearing housing sleeve member), thereby permitting bellcrank actuator arm 44 (not shown in FIG. 1, 2A and 2B) to move pivotally. The aforesaid means for securing the bellcrank housing subassembly 40 to the bellcrank shaft 21 at the second end 21C thereof may comprise a lockwasher, such as 31, and a bearing retaining nut, such as 32. In fact, with reference to preferred embodiment 20, means 30 may have the dual function as means for securing the sleeve 22, the bearing members 23 and 24 and their respective races 23A and 24A, and the spacer 25, and also as means for securing the bellcrank housing subassembly 40 at the second end 21C of the bellcrank shaft 21. However, it is to be noted that this dual function utilization of means 30 is simply as a matter of convenience and not as a matter of any limitation. The bellcrank shaft-to-convergent flap mounting and securing means 50 may comprise spaced double flanges, such as 51 and 52, located at the first end 21A of the bellcrank shaft 21. The double flanges 51 and 52 may be, but need not be, integrated with the bellcraft shaft 21. Preferably, the double flanges 51 and 52 are aligned with and are fixedly secured to the inner and outer skin of the convergent flap 12 by suitable means, such as by welding.

With reference to FIG. 3, which is a bottom view of the convergent flap 12 and of some of the major components of the preferred embodiment 20 of our inventive bellcrank assembly, showing the positional relationship thereof, therein are shown: the fore bellcrank link arm 42; the aft bellcrank link arm 43; and the pivotally moveable bellcrank actuator arm 44 which herein is depicted partially fractured to better orient the reader. Also shown are: the convergent flap 12 with a small portion thereof "C" having the skin removed and showing the internal honeycomb construction of the flap 12; and, directional arrows with appropriate legends, showing the fore direction, the aft direction, the load on the fore bellcrank link arm 42, the load on the aft bellcrank link arm 43, and the load on the bellcrank actuator arm 44.

MANNER OF OPERATION OF THE PREFERRED EMBODIMENT

The manner of operation of the preferred embodiment 20 of our inventive bellcrank assembly, as adapted for mounting on and actuating a convergent flap, such as 12, of an exhaust nozzle, such as 11, of a turbojet engine, such as 10, can very easily be ascertained by a person of ordinary skill in the art, from the foregoing description, coupled with reference to the Figures of the drawings.

For others, suffice it to say, in essence, that by our combining angular contact bearings, such as 23 and 24, with a cross-corner load path arrangement, a highly efficient support system results which carries radial loads and thrust loads in both directions. The outer bearing (i.e., second bearing member 24) carries all of the thrust load when the thrust load (i.e., the flap 12) is directed outward; and, similarly, the inner bearing (i.e., first bearing member 23) carries all of the thrust load when the thrust load (i.e., the flap 12) is directed inward. Both bearings 23 and 24 support the radial load from the actuator link. The bearing support arrangement requires only a single retention nut, such as 32, which is located to load on the inner race 24B of the outer bearing 24. It is to be noted that there is no load carrying member (e.g., spacer 25 or otherwise) which couples the inner races 23B and 24B together.

Our arrangement in its totality is unique, in that by placing the two angular contact bearings 23 and 24 facing each other, a load applied in a thrust direction inward is transmitted from the bearing housing to the outer race 23A of the inner bearing 23 only (i.e., the inward thrust direction would tend to unload the outer bearing 24). The opposite is true for an outward thrust load (i.e., the outer race 24A of the outer bearing 24, and the inner bearing 23 would be unloaded).

CONCLUSION

It is abundantly clear from all of the foregoing, and from the Figures of the drawings herein, that the stated object of our inventive bellcrank assembly have been attained. In addition, related desirable objects also have been achieved. For example: (a) the inventive bellcrank assembly 20 is mounted on the exterior of the flap 12, thereby allowing ease of assembly, inspection, and maintenance without major teardown (i.e., without having to disassemble other nozzle hardware, such as flaps, seals and the like); and, (b) the bellcrank loads are transmitted directly into the skins of the panel or flap, such as 12, thereby permitting the inner flowpath surface to remain smooth.

Additionally, it is to be noted that, although there have been described the fundamental and unique features of our invention as applied to a particular preferred embodiment, various other embodiments, adaptations, additions, substitutions, omissions, and the like will occur to and, can be made by, those of ordinary skill in the art, without departing from the spirit of our invention.

What is claimed is:

1. A bellcrank assembly, adapted for mounting on, and for actuating, a convergent flap of an exhaust nozzle of a turbojet engine, comprising:
    a. a bellcrank shaft having a first end, a middle portion, and a second end;
    b. a sleeve having a first end and a second end, with said sleeve disposed external of and around said bellcrank shaft, and with said sleeve so positioned that said first end of said sleeve is generally located near said middle portion of said bellcrank shaft, and said second end of said sleeve is generally located near said second end of said bellcrank shaft;
    c. a first bearing member of the angular type interposed between said first end of said sleeve and said middle portion of said bellcrank shaft, with said first bearing member having two races, an inner one and an outer one, between which it is moveably positioned;
    d. a second bearing member of the angular type interposed between said second end of said sleeve and said second end of said bellcrank shaft, with said second bearing member having two races, an inner one and an outer one, between which it is moveably positioned;
    e. a spacer disposed between said first bearing member and said second bearing member, and abutting said outer races, with said spacer simultaneously interposed between said sleeve and said bellcrank shaft;
    f. means for securing said sleeve, said first bearing member and races, said second bearing member and races, and said spacer to said bellcrank shaft;

g. a bellcrank housing subassembly, comprising:
  (1) a housing suitably dimensioned and configurated to contain said sleeve, said first bearing member and races, said second bearing member and races, said spacer, and said middle portion and said second end of said bellcrank shaft;
  (2) and, a fore bellcrank link arm, an aft bellcrank link arm, and a bellcrank actuator arm, with all said arms fixedly attached to said sleeve, whereby said bellcrank actuator arm is pivotally moveable;
h. means for securing said bellcrank housing subassembly at said second end of said bellcrank shaft;
i. and, means for mounting and securing said first end of said bellcrank shaft to said convergent flap of said exhaust nozzle of said turbojet engine.

2. A bellcrank assembly, as set forth in claim 1, wherein said means for securing said sleeve, said first bearing member and races, said second bearing member and races, and said spacer to said bellcrank shaft includes a lockwasher and a bearing retaining nut.

3. A bellcrank assembly, as set forth in claim 1, wherein said means for securing said bellcrank housing subassembly at said second end of said bellcrank shaft includes a lockwasher and a bearing retaining nut.

4. A bellcrank assembly, as set forth in claim 1, wherein said means for mounting and securing said first end of said bellcrank shaft to said convergent flap of said exhaust nozzle of said turbojet engine, includes spaced double flanges at said first end of said bellcrank shaft.

* * * * *